Dec. 8, 1959     Z. V. WEISEL     2,916,198
TURBO-COMPRESSOR APPARATUS
Filed June 18, 1956     5 Sheets-Sheet 2

ZENAS V. WEISEL
INVENTOR.

BY *[signature]*
ATTORNEY.

Dec. 8, 1959  Z. V. WEISEL  2,916,198
TURBO-COMPRESSOR APPARATUS
Filed June 18, 1956  5 Sheets-Sheet 3

ZENAS V. WEISEL
INVENTOR.

BY
ATTORNEY.

Dec. 8, 1959  Z. V. WEISEL  2,916,198
TURBO-COMPRESSOR APPARATUS
Filed June 18, 1956  5 Sheets-Sheet 4

ZENAS V. WEISEL
INVENTOR.

BY
ATTORNEY.

Dec. 8, 1959  Z. V. WEISEL  2,916,198
TURBO-COMPRESSOR APPARATUS
Filed June 18, 1956  5 Sheets-Sheet 5

ZENAS V. WEISEL
INVENTOR.

BY
ATTORNEY.

United States Patent Office 2,916,198
Patented Dec. 8, 1959

2,916,198

TURBO-COMPRESSOR APPARATUS

Zenas V. Weisel, Los Angeles, Calif.

Application June 18, 1956, Serial No. 592,105

20 Claims. (Cl. 230—116)

This invention relates to turbine and compressor apparatus, and more particularly to a combination air compressor, exhaust gas turbine, and air-expansion cooling turbine. The invention is particularly adapted for use in the Automobile Air Conditioning and Supercharging System which is the subject matter of my co-pending application, Serial No. 423,936, filed April 19, 1954.

Radial inflow turbines are conventionally formed with an encircling nozzle ring which directs the fluid radially inwardly against the blades of the turbine runner. This nozzle ring is relatively expensive to manufacture, primarily because of the need for great accuracy of construction in order to prevent undue pressure or power loss, and is also undesirable in that the presence of the nozzle ring almost always increases the bulk of the turbine. Furthermore, and unless expensive nozzle vane regulating means are incorporated, the nozzle ring is formed with fixed vanes set at an angle which provides efficient flow for only one throttle setting at a given speed, so that other settings and other speeds result in considerable loss of efficiency and also in deleterious erosion effects.

Similar to the case of the above-mentioned turbines, centrifugal compressor structures have conventionally incorporated encircling diffuser vanes adapted to smoothly retard velocity of the flow of compressed fluid in order to convert the velocity energy into pressure and thus attain a higher compressor efficiency. Such encircling diffuser vanes have also been extremely expensive to construct and have increased the bulk of the compressor units. In situations where diffuser vanes were not employed, it was necessary to use a diffuser cone connected to the outlet scroll and having a very narrow angle, which meant that the cone had to be extremely long and bulky.

In view of the above factors characteristic of conventional turbine and compressor structures, it is an object of the present invention to provide extremely simple, rugged, compact and efficient turbines, compressors, pumps, or turbo-compressors which completely eliminate the need for turbine nozzle vanes or compressor diffuser vanes.

An additional object is to provide a radial inflow turbine which operates in the absence of nozzle vanes, and which is designed along venturi principles to provide great smoothness and efficiency of operation.

An additional object is to provide a turbine incorporating novel valve means adapted to vary the shape and cross-sectional area of the turbine inlet scroll, and thus the pressure drop across the turbine and the speed thereof. In exhaust gas turbines, turbine speed is thus rendered less dependent upon engine speed.

An additional object is to provide a centrifugal compressor in which the rotor discharges compressed fluid into an encircling scroll having a cross section which is so shaped, in combination with a wide-angled diffuser cone, that the necessity for diffuser blades is eliminated.

Another object of the invention is the provision of a compressor featuring overall compactness accomplished without sacrificing efficiency by the use of an outlet scroll generally circular in cross-section and fed tangentially from the rim of the impeller to create a whirl velocity and wherein the total velocity head is converted efficiently into pressure head as the fluid expands through a wide angle diffuser cone. Compressor compactness is achieved in large part by locating the scroll chamber laterally of the impeller chamber with the latter opening tangentially into the scroll chamber substantially throughout its annular extent and additionally by the elimination of the conventional diffuser blades. The whirl action thereby imparted to the discharging fluid permits the use of a much shorter diffuser cone without loss in efficiency than is possible in any prior design.

Another object of the invention is the provision of a turbo-compressor having turbine and compressor runners supported from a common shaft mounted in bearing means remote from the turbine and positioned to be cooled by the cool fluid entering the compressor.

An additional object is to provide a combination unit comprising an exhaust gas turbine, air compressor, and air-expansion turbine which are mounted on a common shaft, and in which the air-expansion turbine discharges directly into, and the compressor takes air directly from, the automobile passenger compartment, so that optimum cooling effects are achieved without the necessity of providing ducting between the combination unit and the passenger compartment. The arrangement also permits mounting of the unit between fire wall and engine carburetor, where it interferes least with engine maintenance.

A further object of the invention is to provide turbine and compressor rotors which extend radially outwardly to the outer walls of the laterally disposed scroll to achieve maximum energy input for a given diameter scroll chamber and increased turbine efficiency.

A further object is to provide a turbo-compressor the casing of which has a circular outer wall for increased compactness, as distinguished from the conventional scroll-shaped outer wall.

These and other more specific objects will appear upon reading the following specification and claims and upon considering in connection therewith the attached drawings to which they relate.

Figure 1:
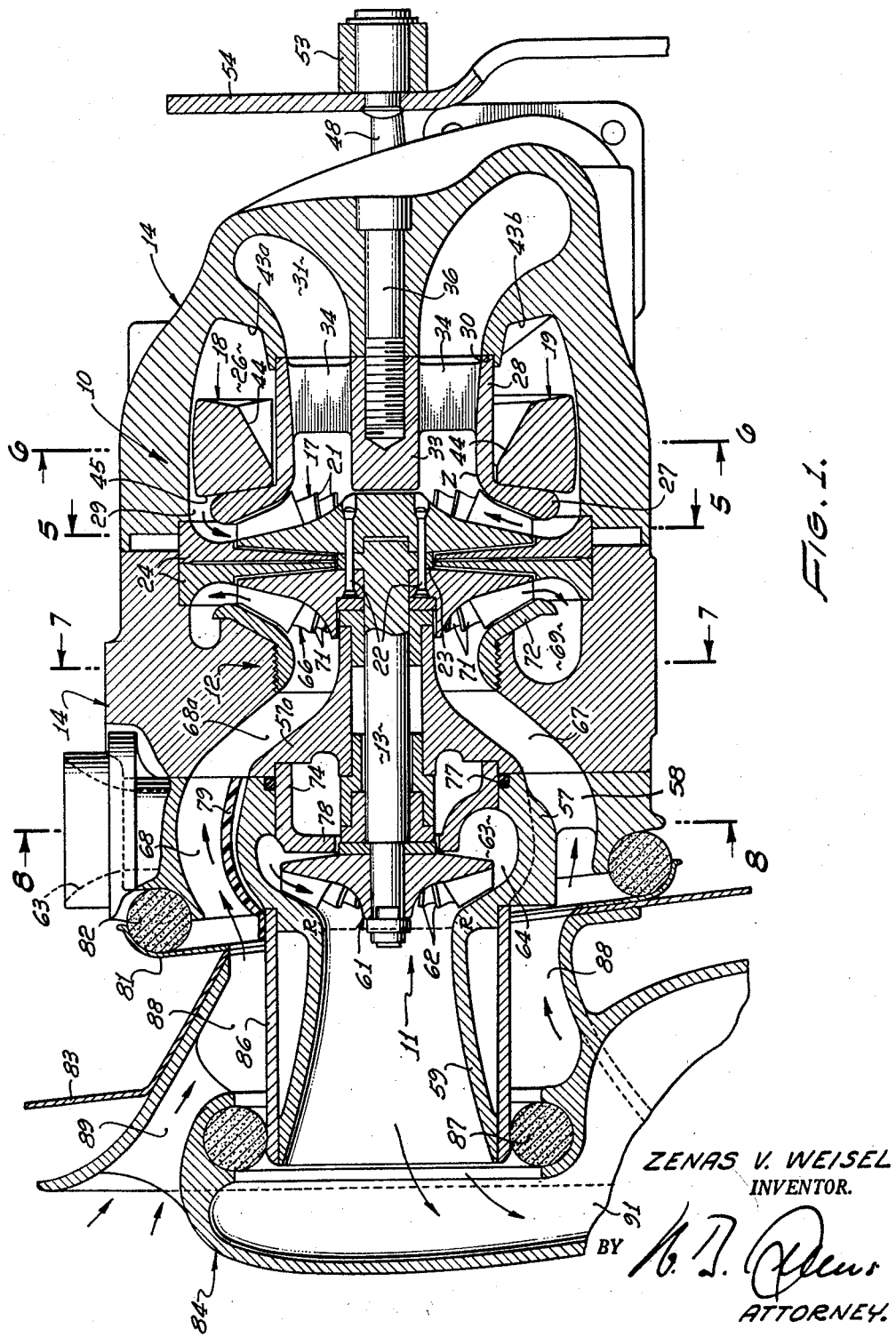
Figure 1 is a longitudinal, vertical, central sectional view of a turbo-compressor constructed in accordance with the present invention, the structure being shown as associated with the fire wall of an automobile.

Referring now to the drawings, and particularly to Figure 1 thereof, the turbo-compressor apparatus may be seen to comprise first and second radial inflow turbines 10 and 11 and a centrifugal compressor 12 which are associated with each other by means of a common shaft 13. Turbines 10 and 11 and compressor 12 include a common outer casing 14 which is formed of a number of cast-metal components secured together as by longitudinally extending bolts such as are shown at 16 in Figures 5-8. It is a feature of the invention that the peripheral wall of outer casing 14 is generally circular in shape as shown in Figures 5-8, and thus is more compact than conventional structures in which the peripheral wall is scroll shaped.

The turbines 10 and 11, which will be described in detail below, have a wide variety of uses and may be driven by both compressible and incompressible fluids. However, and as above indicated, the turbines and compressor will be described as incorporated in an automobile air-conditioning system such as is illustrated in my above-cited co-pending application. Thus, in the indicated automobile air-conditioning system, the first turbine 10 is an exhaust gas turbine operated by exhaust gases from the engine of the automobile, whereas the second turbine 11 is an air-expansion turbine which is driven by expanding cooled compressed air. The turbines 10 and 11 combine to supply power to shaft 13 and thus drive the centrifugal compressor 12, which in the illustrated example operates as an air compressor. Stated generally, the air compressed by compressor 12 is cooled in an intercooler and then delivered to the inlet of air-expansion turbine 11, where its expansion, and the work subtracted from it, result in further cooling so that the expanded air may be delivered to the passenger compartment of the automobile to produce a cooling effect. The means for delivering cooled air from the cooling turbine 11 to the passenger compartment, as well as withdrawing stale air from the passenger compartment for compression by compressor 12, form a part of the invention and will be set forth subsequently in connection with the detailed description of turbine 11 and compressor 12.

Figure 3:
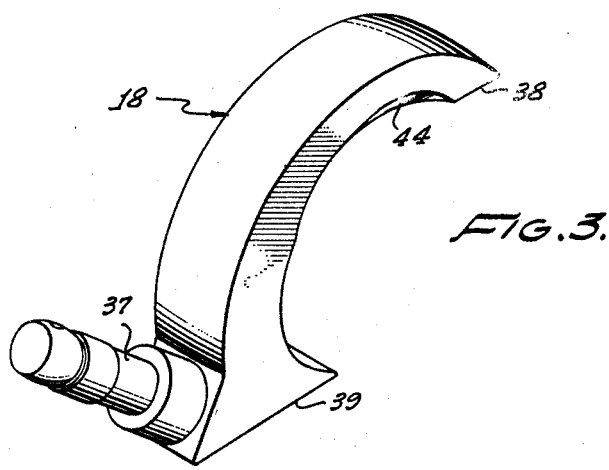
Figure 3 is a perspective view of one of the wing valves which controls the shape and cross-sectional area of the exhaust gas turbine inlet scroll.
Figure 4:
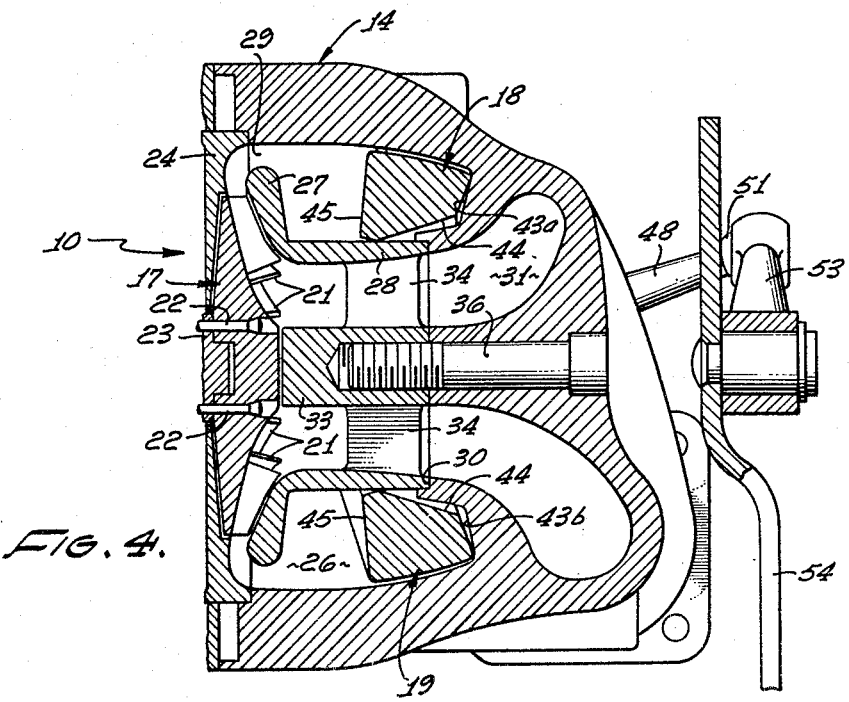
Figure 4 is a fragmentary, vertical, central sectional view corresponding to the right portion of the showing of Figure 1, but illustrating the wing valves in their positions opposite from those illustrated in Figure 1.
Figure 5:
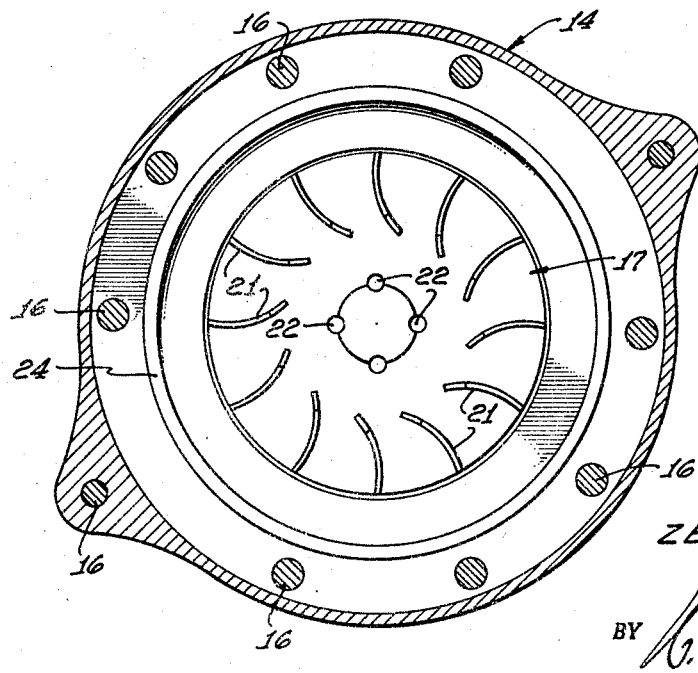
Figure 5 is a transverse sectional view taken generally along line 5—5 of Figure 1 and showing the rotor blade structure of the exhaust gas turbine.

Proceeding first to a description of the exhaust gas turbine 10, and with particular reference to Figures 1-6, that element comprises a runner 17 and a pair of arcuate wing valve elements 18 and 19. Runner 17 is formed with blades 21 which are substantially radial at their outer portions but which curved backwardly at their inner portions, relative to the direction of rotation, as shown in Figure 5. Blades 21 extend generally perpendicularly to the disc-shaped back or body of the runner.

The runner 17 is secured by means of rivets 22 to a flange 23 at the right end of shaft 13, as shown in Figure 1. Flange 23 rotates in a central opening in a pair of septum plates 24 which separate the exhaust gas turbine chamber from the compressor chamber, the plates 24 being disposed back to back between retaining shoulder components of outer casing 14. The disc portion of runner 17 is recessed into the right one of septum plates 24, the construction being such that incoming exhaust gases may flow from a chamber 26 radially inwardly between the runner blades 21 for axial discharge as will be described below. This radial inflow is, because of the construction of the blades 21 and cooperating passage-forming means, extremely efficient and smooth.

Chamber 26, which may be referred to as a combination scroll and valve chamber, is defined at its outer portion by interior walls of the right-hand component of outer casing 14, as viewed in Figure 1, and at its inner portion by an insert member having a conical portion 27 which is integral at its center with a generally cylindrical portion 28. The peripheral part of conical portion 27 is spaced from the adjacent interior wall of casing 14 to provide an annular passage 29 through which gases may flow from chamber 26 and radially inwardly between the rotor blades 21. The opposite end of the insert, that is to say the right end of cylindrical portion 28, is recessed into a cooperating internal shoulder portion 30 of casing 14 so shaped that axially discharging gases may flow through cylindrical portion 28 and to an outlet scroll passage 31 in casing 14. Scroll passage 31 communicates with a duct 32 (Figure 2) which discharges to the ambient atmosphere as described in the cited co-pending application.

The insert comprising portions 27 and 28 is mounted in position by means of an axially located cylinder 33 which connects by means of spider arms 34 to cylindrical insert portion 28. A large-sized screw 36 is threaded axially through the outer casing 14 into cylinder 33 and, when screwed up tight, holds the insert in rigid abutment with the indicated shoulder portion 30.

Figure 6:
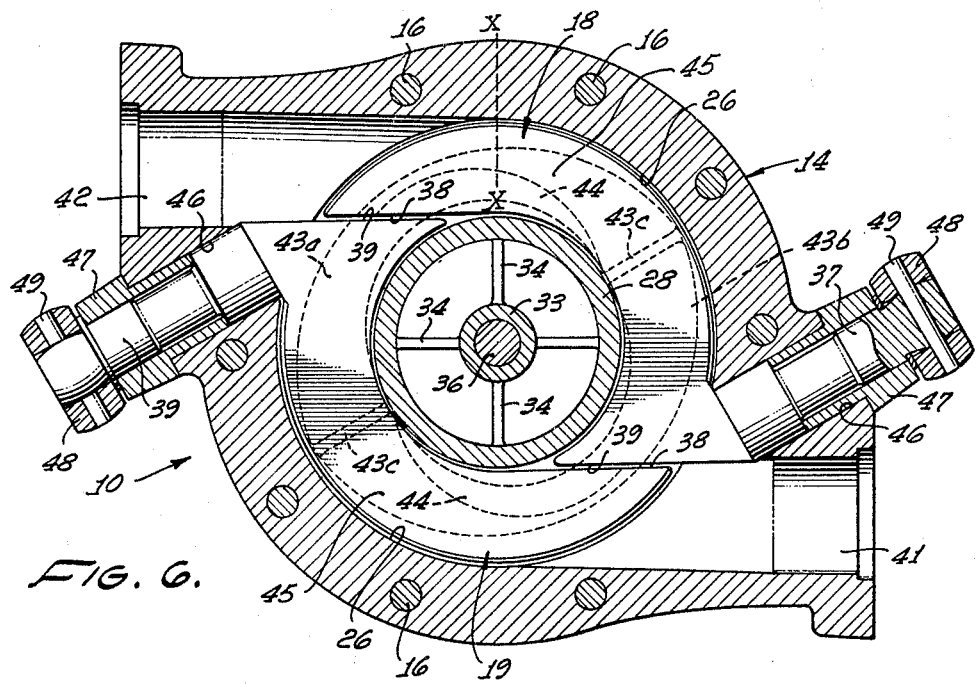
Figure 6 is a transverse section taken along line 6—6 of Figure 1, illustrating the exhaust gas turbine inlet scroll and the arcuate control valves therein.

Referring particularly to Figure 3, each wing valve 18 or 19 is seen to comprise a substantially semicircular main body, of generally rectangular section, which is integrally associated at one end with a shank 37. As best shown in Figure 6, the shank 37 extends tangentially outwardly and generally parallel to a bisecting radius of the semicircle which forms the valve body. Formed at the ends of the valve body are flat, parallel surfaces 38 and 39, the former being at the free end of the body and forming a substantial point or wedge at the end thereof, and the latter being adjacent the shank 37. Surfaces 38 and 39 are not parallel to the shank 37, but instead are inclined relative thereto as shown in Figure 6. Thus, in connection with the wing valve 18 as shown in Figure 6, the surfaces 38 and 39 lie in horizontal planes whereas the shank 37 inclines upwardly and to the right.

The chamber 26 in which valves 18 and 19 are mounted is generally annular in shape and communicates with tangential inlets 41 and 42 which extend outwardly and parallel to each other, but in opposite directions, as shown in Figure 6. The portion of chamber 26 remote from conical portion 27 of the insert member, that is to say the chamber portion to the right as viewed in Figures 1 and 4, is recessed generally in the manner of a double cone. This double cone has sloping surfaces 43a and 43b meeting at peaks 43c (Figure 6) approximately midway between the diametrically opposite inlets 41 and 42. The chamber is thus adapted for pivoting of the bodies of wing valve members 18 and 19 about their shanks 37, and as will be described below. In addition, pivoting of the wing member bodies is permitted by recesses or bevels 44 cut out of the inner right portions of the wing valve bodies as viewed in Figures 1 and 4. These recesses permit pivoting of the valves to the extreme right position shown in Figure 4, and in which the recesses 44 fit over the shoulder portion 30 of casing 14.

Referring again to Figure 6, the arcuate or wing valves 18 and 19 are mounted in chamber 26 in complementary fashion, with their respective shanks 37 parallel to each other and extending outwardly in opposite directions tangentially of chamber 26 much in the manner of inlets 41 and 42. However, the shanks 37 are not coincident with the respective inlets, but instead are inclined relative thereto as if the valves 18 and 19 had been rotated together counterclockwise away from the inlets 41 and 42. Each shank 37 extends through a bore 46 in outer casing 14, and has associated therewith a suitable bushing or collar 47 which effects a seal and also facilitates valve rotation.

Figure 2:
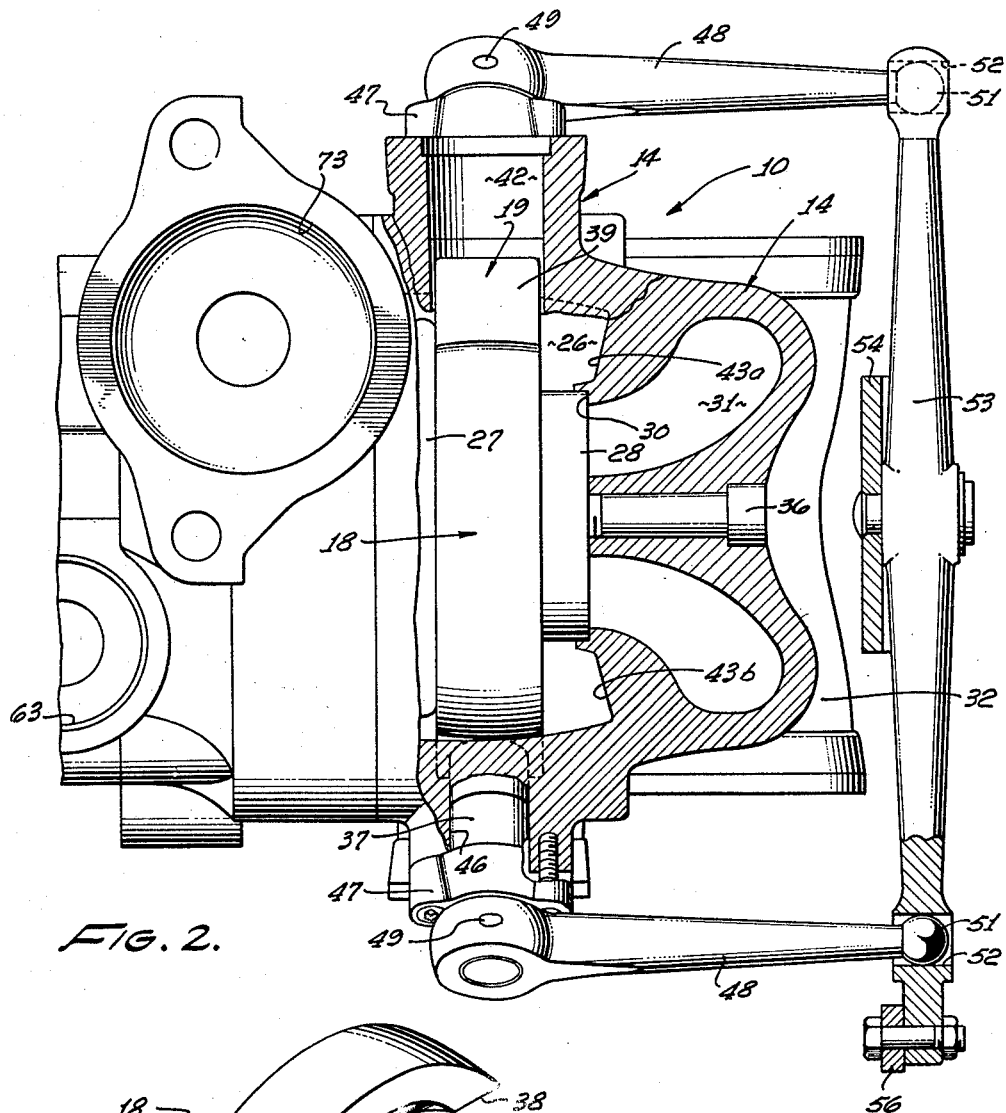
Figure 2 is a top plan view of the right-hand portion of the showing of Figure 1, portions of the exhaust gas turbine being broken away and sectioned in order to better illustrate the inlet and outlet passages thereof.

The inlets 41 and 42 and the shanks 37 preferably lie in the same radial plane as shown in Figure 2, such plane being so located along the axis of the apparatus that the inlets 41 and 42 enter the sides of chamber 26 relatively adjacent conical insert portion 27. There is thus room at the other side of the chamber (at the right in Figures 1, 2 and 4) to receive the bodies of valves 18 and 19 when they are pivoted to the Figure 4 position.

It may be seen upon reference to Figure 6 that the flat surfaces 38 and 39 of the respective valves 18 and 19 lie relatively close to each other, so that the valve bodies cooperate to form a ring which extends substantially completely around the chamber 26.

One of the inlets 41 and 42 is connected to a suitable source of fluid under pressure, such as the exhaust manifold of one bank of cylinders of the automobile engine. Similarly, the other inlet is connected to the exhaust manifold of the other bank of cylinders. Exhaust gases thus enter both inlets 41 and 42 and whirl around in a clockwise direction as shown in Figure 6, at the same time passing through annular passage 29 and radially inwardly between the runner blades 21 for axial exhaust through cylinder portion 28 into the outlet scroll 31. As the gases enter the inlets 41 and 42 they are directed not only by an interior wall of casing 14 but also by the flat surfaces 39 of wing valves 18 and 19, which form part of the means to define the inlet passages or nozzles. Certain portions of the radial walls of the wing valves also aid in defining such inlet passages.

As shown in Figure 6, the shank 37 of each valve is disposed on the diametrically opposite side of the longitudinal axis of the apparatus from the wedge or point (i.e. free end) of each valve. This, coupled with the fact that each shank 37 lies generally in the same radial plane as its associated inlet 41 or 42, means that the point or wedge of the valve will pivot a substantial distance to the right of the plane of shanks 37 and inlets 41 and 42 when in the Figure 4 position. This means that the gases entering inlets 41 and 42 will be crowded toward annular passage 29 by the inner radial walls 45 of the wing valve bodies, so that these radial walls 45 form the side walls of decreasing-area scroll passages.

When the wing valves 18 and 19 are in the positions shown in Figure 1, with walls 45 adjacent the cone portion 27, there is very little cross-sectional area in chamber 26 through which entering exhaust gases may flow. This means that the gases will speed up rapidly and that the gases will almost immediately flow through annular passage 29 and between the runner blades 21. The speed of the turbine will then be high and the pressure drop thereacross will be high. When, on the other hand, the wing valves 18 and 19 are in the positions shown in Figure 4, remote from conical portion 27, the cross-sectional area of chamber 26 through which the entering gases may flow will be the maximum. The velocity of gas flow will thus be minimized, as will be the pressure drop across the turbine, and the runner 17 will operate at minimum speed for a given engine throttle setting and exhaust gas rate of flow. The wing valves can thus be used to effect high turbine speed at low engine speed (engine throttle setting), and vice versa.

As previously pointed out, the effective cross-sectional area of chamber 26, when the valves 18 and 19 are in the Figure 4 position or in any position spaced from cone 27, becomes increasingly small, with a scroll effect, due to the described slant of walls 45 toward the right (in Figure 4) from the shanks 37. Thus, exhaust gases entering inlet 42, for example, flow through a secondary inlet nozzle scroll formed by the outer interior wall of casing 14, by the end surface 39 of wing valve 19 (and later by cylinder portion 28), by wall 45 of valve 18, and by conical insert portion 28. The gases entering inlet 42 are therefore progressively crowded into the annular passage 29, so that substantially all of the incoming gases have entered the passage 29 by the time the portion of wing valve 18 adjacent its shank 37 is reached. A similar action, of course, occurs with relation to the inlet 41.

In order to pivot the wing valves 18 and 19 between the positions shown in Figure 1 and the positions shown in Figure 4, and to any desired corresponding intermediate positions, a crank 48 is mounted on the rounded outer end portion of each shank 37 as shown in Figures 2 and 6, preferably by means of a pin 49 which permits a substantial amount of play. The outer ends of the cranks 48 are, as shown in Figure 2, formed as balls 51 which are mounted in openings 52 in opposite ends of a rocker lever 53, the center of the lever being pivoted on a bracket 54 which may be mounted on casing 14 or on any other stationary element. The rocker lever 53 is actuated by means of a connecting link 56 indicated in Figure 2, and which leads to a suitable control apparatus as set forth in the cited co-pending application. It will be seen that actuation of connecting link 56 to pivot rocker lever 53 effects rotation of cranks 48 and thus of wing valves 18 and 19 in opposite directions, which effects corresponding movement of the wing valve bodies between the positions shown in Figure 1 and those shown in Figure 4.

Proceeding next to a description of the second radial inflow turbine 11, that turbine includes an inner casing 57 disposed within one end component of outer casing 14 and integrally connected thereto by means of a plurality of radially extending, arcuately spaced spider legs 58. The inner casing 57 is formed with a divergent, conical discharge portion 59 which discharges directly into the passenger compartment of the automobile or other vehicle, as will be described subsequently. Turbine 11 also includes a runner 61 mounted on the end of shaft 13 remote from runner 17, and which has blades 62 corresponding generally to the blades 21 of runner 17. Thus, blades 62 are generally radial at their tips, but curve at their center portions rearwardly relative to the direction of rotation. Also as in the case of blades 21, blades 62 are generally perpendicular to the face or disc portion of the runner.

Figure 8:
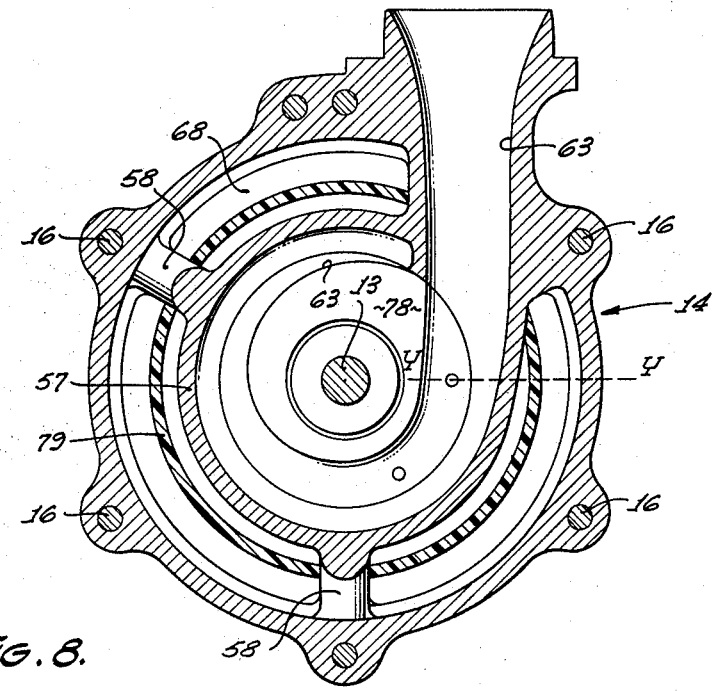
Figure 8 is a section along line 8—8 of Figure 1, illustrating the inlet scroll of the air-expansion turbine.

The inlet of turbine 11 is shown in Figure 8 as comprising a scroll passage 63 which extends through outer casing 14 and inner casing 57, and which is adapted to discharge air through an annular passage 64 (Figure 1) and radially inwardly between the runner blades 62. A fluid such as compressed air enters the scroll passage 63 and flows in a clockwise spiral as viewed in Figure 8, after which it flows between the runner blades and out the discharge portion 59 to the passenger compartment. Operation is similar to that of the first turbine 10 except that no valve means are provided for regulating flow.

Proceeding next to a description of the centrifugal compressor 12, that element includes an impeller 66 which is recessed into septum plate 24 and is secured to flange 23 by means of rivets 22 correspondingly to the case of runner 17, these elements being disposed in back-to-back relationship. The impeller 66 is thus driven by runners 17 and 61, acting conjointly and through the common shaft 13. The shaft 13 is journaled by means of suitable bushings and spacers in a conical continuation 57a of inner casing 57, such continuation being connected by means of arcuately spaced radial spider legs 67 with the corresponding central component of outer casing 14.

The air to be compressed by compressor 12 is withdrawn from the automobile passenger compartment through means to be described subsequently, after which it passes through an annular passage 68 and its extension 68a around inner casing 57 and inner casing 57a, respectively. The air then is impelled radially by impeller 66, and is discharged peripherally through a volute or scroll passage 69 best shown in Figure 7. The radial passages between the impeller blades 71, which may be of conventional construction are in part formed by a cone plate 72 which is threaded into the central component of outer casing 14 and which aids in forming the passage 68a. Cone plate 72 is formed with a peripheral portion which cooperates with the casing 14 to cause volute or scroll passage 69 to have a substantially circular cross-sectional shape as shown in Figure 1.

Figure 7:
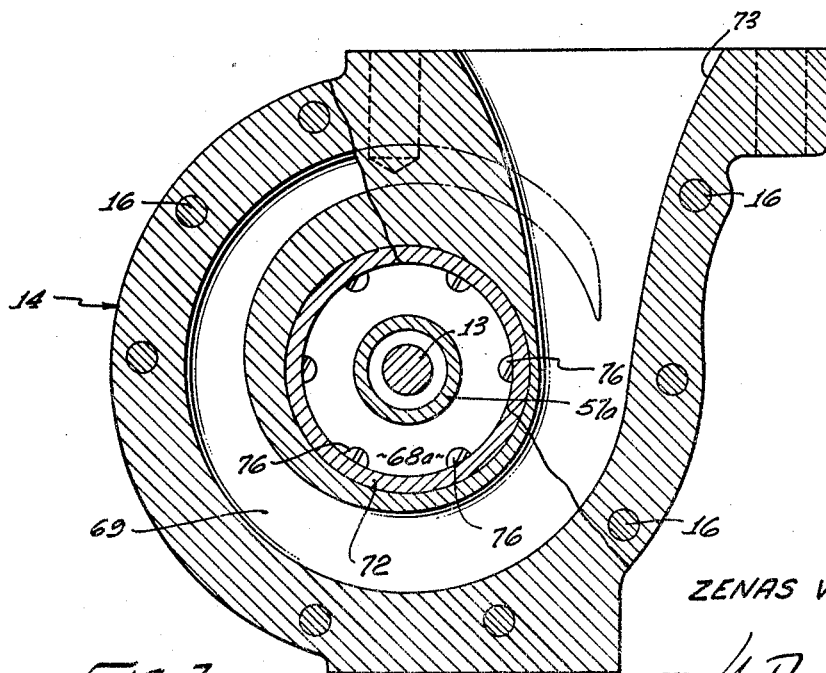
Figure 7 is a transverse sectional view taken along line 7—7 of Figure 1 and showing the outlet scroll and diffuser cone of the compressor.

The described circular cross-sectional shape of volute 69 is of extreme importance since it causes the air discharging radially from between impeller blades 71 to whirl in the manner of a vortex within the volute 69, and this makes it possible to use the short, steep wide-angled diffuser cone 73 which communicates with scroll passage 69 as shown in Figure 7. Normally, a diffuser cone for a compressor, in order to make the compressor efficient without providing undesired expensive and bulky diffuser vanes, must be very long and have a narrow angle. Whirling or vortex action of the air in volute 69 resulting from the annular discharge of fluid from the impeller tangentially into the circular cross section of the volute makes it feasible to employ a much shorter wide-angled diffuser cone without sacrificing operating efficiency. The resulting construction is unusually compact having a discharge diffuser tube much shorter than heretofore and providing a structure even more compact than designs utilizing diffuser rings.

Proceeding next to a description of the remaining structural components of the apparatus shown in Figure 1, including the combined inlet and outlet means associated with the passenger compartment of the automobile, the inner casing element 57a serves as a means for mounting a cylindrical element 74 which is disposed within inner casing 57. For this purpose, screws 76 may be inserted through inner casing 57a and into cylinder 74 as shown in Figure 7. An O-ring 77 may be provided around cylinder 74 to form a seal between inner casing elements 57 and 57a. The cylindrical element 74 has a radially inwardly extending flange 78 at its outer end and which cooperates in forming the scroll passage 63 of turbine 11, as well as the septum of that turbine.

Since the function of turbine 11 is to cool compressed air by expanding it and by extracting work therefrom, it is important that the inner casing 57 should not be heated by the air which flows through the above-described annular passage 68 between outer casing 14 and inner casing 57. Accordingly, a shroud 79 is mounted around inner casing 57 between spider legs 58 as best shown in Figure 8. The shroud 79 is preferably formed of plastic and is spaced radially outwardly from inner casing 57 to provide a dead air insulating space.

A generally dish-shaped open-centered end cap 81 is provided at the left end of outer casing 14, as viewed in Figure 1, and is sealingly associated therewith by means of a sealing ring 82. The end cap 81 is welded or otherwise secured to the fire wall 83 of the automobile at a point where the fire wall is recessed forwardly as illustrated at the upper left portion of Figure 1. It is to be understood, however, the fire wall does not constitute the support for the outer casing 14, suitable bracket means, not shown, being provided for that purpose. Sealing ring 82 is formed of flexible material so as to permit relative movement between the parts, while at the same time effecting an air seal.

An air inlet-discharge member 84 is mounted in the automobile passenger compartment on the other side of fire wall 83 from casing 14. Member 84 is shaped so as to encompass the discharge portion 59 of inner casing 57, and is sealingly associated with a sleeve 86 around discharge portion 59 by means of a sealing ring 87. Sleeve 86 cooperates with shroud 79 in preventing heating of turbine 11 by the intake air to the compressor. The inlet-discharge member defines an annular space 88 around sleeve 86, and into which air is admitted through a passage 89 at the upper and side portions of member 84. Stale air from the automobile passenger compartment (and fresh air from an outside air scoop, not shown) is drawn into passage 89 and enters space 88, after which it flows through annular openings in fire wall 83 and end cap 81 and into the annular passages 68 and 68a leading to the eye of compressor 12. As previously indicated, the compressor 12 then compresses the air and passes it through a heat exchanger where cooling occurs, after which the air is passed through turbine 11 and discharged axially out the discharge portion 59. The air then flows downwardly through a duct portion 91 of inlet-discharge member 84, after which it is discharged generally along the floor of the passenger compartment, or is directed to other desired discharge points in the car.

The above-described direct discharge from turbine 11 into the passenger compartment, as well as the direct intake of stale air from the passenger compartment (and some fresh air from the outside air scoop) and around the turbine 11 to compressor 12, are highly desirable for reasons including the fact that a substantial amount of ducting, with attendant insulation problems, etc., is eliminated. Space saving is also achieved, and no separate air blowers or exhausts are required.

To summarize the operation of the form of the invention shown in Figures 1–8, exhaust gases from the automobile engine are fed into inlets 41 and 42 (Figure 6) and thus into the scroll and valve chamber 26. They then pass through the annular passage 29 and radially inwardly between the blades 21 of turbine runner 17, after which they discharge axially through the cylinder 26 for exhaust through passages 31 and 32 (Figure 2). When the scroll wing valves 18 and 19 are in the positions shown in Figure 1, the effective cross-sectional area of valve chamber 26 through which exhaust gases may pass is small, which means that there will be a high flow velocity through the turbine and a high pressure drop thereacross. Accordingly, turbine speed is then great but the back pressure against the automobile engine is also great. When the wing valves 18 and 19 are shifted to the positions shown in Figure 4, the effective cross-sectional area of chamber 26 is much greater, which means that gas flow velocity will be relatively low, as will the pressure drop. The turbine speed will then be low, and the back pressure against the automobile engine will also be low. This shifting of the wing valves 18 and 19 between the Figure 1 position and the Figure 4 position, or to any intermediate position, is effected by means of the cranks 48, rocker lever 53, link 56, etc., as shown in Figure 2 and described previously. The above explanation assumes a given engine throttle setting, it being understood that the valves are normally in the Figure 1 position at low engine speed.

The described rotation of turbine runner 17 operates (in conjunction with turbine runner 61) to rotate the impeller 66 of centrifugal compressor 12. The air from the passenger compartment of the automobile, and drawn into the eye of compressor 12 through passages and spaces 89, 88, 68 and 68a, is thus compressed and discharged into scroll or volute 69 and thus into diffuser cone 73 as shown in Figure 7. Because of the circular cross section of scroll 69, and tangential inlet of air from the impeller into the scroll, the air is caused to whirl therein in a vortex action, which makes possible the short, wide-angled diffuser cone 73 as above described. Compressed air is discharged from diffuser cone 73, as set forth in the cited co-pending application, through an intercooler where it is cooled and then is conducted into scroll inlet passage 63 (Figure 8) of the second radial inflow turbine 11.

Turbine inlet passage 63 discharges through annular passage 64 around the periphery of runner 61, so that the compressed air expands radially inwardly between the runner blades 62 and then axially through discharge portion 59 to the duct portion 91 leading to the passenger compartment of the automobile. As the air expands radially inwardly between the runner blades 62, it is cooled not only because of the expansion but also because work is subtracted therefrom and delivered to shaft 13, and thus to the compressor impeller 66. The very substantial amount of cooling thus achieved means that the air discharged through duct 91 to the passenger compartment will be sufficiently cooled to effect air conditioning thereof.

It is emphasized that the construction of the turbines 10 and 11 without nozzle rings or vanes, and the construction of compressor 12 without diffuser vanes, greatly reduces the cost of production of the described apparatus, as well as reducing the size and diameter thereof. The apparatus is extremely simple and rugged, yet is highly efficient and effective for a wide variety of purposes. The scroll wing valves 18 and 19 are very simple to construct and operate yet are much more reliable than flexible valve members, for example.

Figure 9:
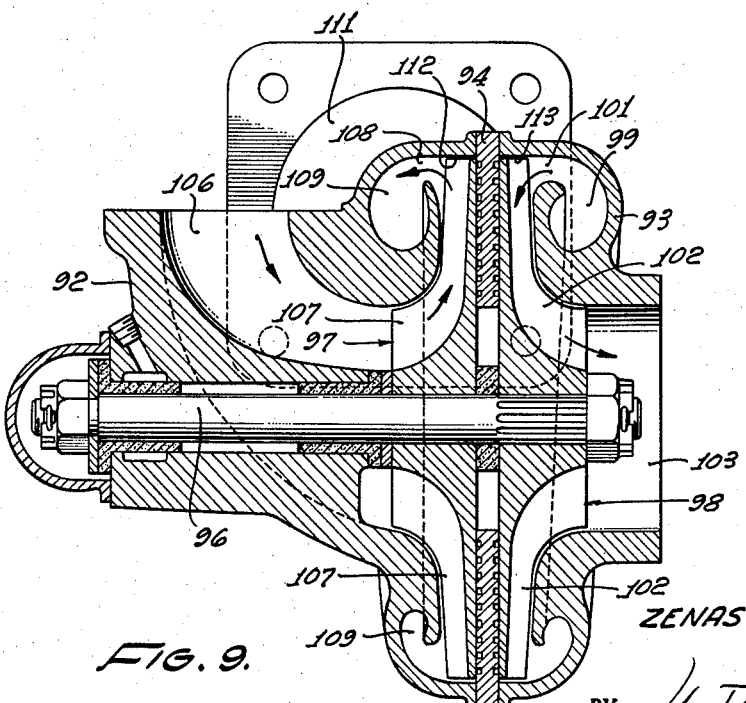
Figure 9 is a longitudinal, central sectional view of a second embodiment of the invention, in which the turbine and compressor rotors extend radially to the outer walls of the associated scrolls.

Referring next to Figure 9, a second embodiment of the invention is illustrated. In this embodiment, a compressor casing 92 and a turbine casing 93 are shown as separated by a labyrinth type dividing and sealing member 94. Suitably journaled in the casing 92 is a shaft 96 on which are mounted rotors comprising a compressor impeller 97 and a turbine runner 98 disposed in back-to-back relationship.

The turbine casing 93 is shaped with a scroll passage 99 to which exhaust gases or other motive fluid (liquid or gas) are fed from a suitable tangential inlet, not shown. Scroll passage 99 communicates through an annular passage 101 with the passages between blades 102 of runner 98. The fluid which flows radially inwardly between blades 102 to the eye of the turbine is discharged axially through a conduit 103. The blades 102 are generally perpendicular to the face of the disc portion of the runner, are radial at their tips, and are curved backwardly relative to the direction of rotation at their inner portions, all as shown and described in connection with Figure 5 relative to the previous embodiment.

The compressor casing 92 is formed with an axial inlet passage 106 which feeds air or other fluid to the eye of impeller 97. The fluid then flows radially between the impeller blades 107 and is discharged through an annular passage 108 and into an outlet scroll passage 109. Outlet scroll 109 is of generally circular cross-sectional shape as described in connection with the previous embodiment, and communicates with a short, wide-angled diffuser cone indicated at 111. The impeller blades 107 may be of conventional construction except as will next be described.

It is a very important feature of the form of the invention shown in Figure 9 that the peripheral portions of impeller 97 and runner 98 extend radially to adjacent outer interior walls 112 and 113 of the compressor and turbine casings, respectively. Thus the peripheral portions of the runner and impeller are laterally or axially adjacent the annular passages 101 and 108, and are laterally or axially adjacent the scroll passages 99 and 109. This is to be contrasted with the construction shown in Figure 1, in which the peripheral portions of the runner and impeller do not extend to the outer interior casing walls, and are adapted to discharge or receive fluid radially instead of laterally or axially. The construction shown in Figure 9 is advantageous in that it minimizes fluid friction, due to the fact that the fluid moves with the peripheral portions of the runner and impeller backs instead of immediately encountering or leaving a stationary element such as is formed by the curved recessed walls in septum plates 24 shown in Figure 1. Stated differently, the discharging fluid passes directly from the face of the rotating impeller into the scroll chamber so designed as to maintain the flow velocity and thereby avoiding the velocity losses inherent in contact with a stationary flow diverting annulus such as septum plates 24. Additionally a greater energy input is achieved by virtue of the velocity gained from the use of a larger diameter impeller. It is further pointed out that the lateral discharge of fluid tangentially into the scroll permits the use of a circumferentially shorter scroll with attendant smaller frictional losses. The reduction in fluid friction is, of course, important in increasing turbine and compressor efficiency.

There will be next described an important theory or principle in accordance with which the turbines described in the present specification are constructed. It should first, however, be understood that the velocity of flow in the conduits leading to and from the respective turbines is approximately equal. Within the turbine, however, the flow velocity first increases and then decreases much as occurs in a venturi tube, and the principle or theory of turbine operation may thus be described by analogy to a venturi, or to the diffuser or outlet portion of a venturi.

The inlet portion of each turbine, that is to say, the "nozzle" element which effects increase in fluid flow velocity, is preferably made such as to convert about forty to sixty percent of the available pressure head into velocity. More particularly, the nozzle should be such as to convert approximately fifty percent of the available pressure head into velocity, assuming a runner with vanes radial at their tips. The taper of this inlet nozzle may be relatively steep without substantially adversely affecting turbine efficiency, just as the inlet or converging portion of a venturi tube may be relatively steep or wide-angled. In the showing of Figure 6, for example, this inlet nozzle comprises the portion between the outer end of inlet nozzle 42 (or a decreasing area pipe connected thereto) and the line X—X which comprises a radius of the apparatus perpendicular to the inlet nozzle passage 42. This same theory applies, of course, for the inlet nozzle 41 and its associated parts. In Figure 8, relative to the second turbine 11, the inlet nozzle may be seen to be the portion of passage 63 outwardly of the line Y—Y which also lies along a radius of the turbine perpendicular to the inlet passage. As previously indicated, this inlet nozzle may have varying angles and is determined by standard nozzle design theory.

Each turbine runner is so designed that the effective flow path of the fluid from the periphery to the outlet of the runner takes place along a spiral path much longer than the runner radius and wherein the cross-sectional area of the flow path diverges substantially uniformly in the manner of an outlet venturi cone of circular section having a total included angle of between 3 and 15 degrees, and preferably about 10 degrees. Stated otherwise, the portion of each turbine through which fluid flows after leaving the inlet nozzle and along a spiral path to the outlet of the runner should be equivalent to the outlet or diffuser cone of a venturi of circular section, the diffuser cone having an included angle of between three degrees and fifteen degrees, preferably ten degrees. Since the fluid flow is thus made analogous to that through a venturi, it is smooth and efficient, there being no abrupt changes which tend to impair efficiency. The rate of increase in flow area is gradual. It has been determined that if the included angle is less than three degrees the turbine produces low power for a given size and is thus undesirable. On the other hand, if the included angle is greater than fifteen degrees the efficiency becomes poor due to excessive eddies and turbulence as a result of a too rapid decrease in the flow velocity. Ten degrees included angle is preferred since this produces an excellent balance between size and efficiency, and does not result in excessive disc friction and other losses.

In designing a turbine runner to have a flow path equivalent to the diffuser cone or outlet venturi portion, of the type indicated, it is necessary to determine the cross-sectional area at the inlet of the diffuser outlet cone (i.e., the cross-sectional area at the venturi throat), the cross-sectional area at the turbine runner discharge, and the length of fluid flow path between the diffuser inlet (venturi throat) and the discharge.

The cross-sectional area at the diffuser inlet (venturi throat) is that at X—X in Figure 6 or Y—Y in Figure 8; that is to say, in a plane containing the axis of the turbine and generally perpendicular to the inlet passage. In the case of turbine 10, this area varies in accordance with the position of scroll wing valves 18 or 19, but this is compenated for by making the wing valve chamber 26 and the valves 18 and 19 of such shapes and sizes that the diffuser angle will be between three degrees and fifteen degrees throughout the normal operating range of the turbine 10.

The outlet area of the diffuser (i.e., the wide or discharge end of the venturi) is the area of the discharge passage (or eye) through which fluid flows after leaving the runner passages. Thus, in Figure 1, the outlet area would be the area lying in a radial plane around cylinder 33 at the indicated point Z. Relative to the turbine 11, as shown in Figure 1, the outlet area would be that within discharge element 59 and lying in a radial plane adjacent the end of shaft 13, labeled R—R.

The length of the equivalent diffuser cone or outlet venturi section is not merely the radial distance through the turbine, but instead must be taken as the effective means spiral path along which a particle of fluid flows in passing through the turbine. Thus, compensation is made for the fact that the fluid whirls while flowing radially through the turbine. This effective mean spiral path may be calculated in a manner known to the art, the computation of the spiral path length being normally made at rated flow.

As an example of a turbine which is equivalent to the outlet or diffuser portion of a venturi, and with particular reference to the second radial inflow turbine 11, let it be assumed that it is desired to design the turbine so that it is provided with a flow path through the runner equivalent to that of an outlet venturi cone (diffuser) having an included angle of ten degrees. To accomplish this, the length of the spiral path of flow through the turbine 11 between the "venturi throat" (Y—Y in Figure 8) and the discharge of the turbine runner (the throat or smallest portion of element 59, adjacent shaft 13) is first computed. The cross-sectional areas at the inlet and the outlet of a ten degree diffuser or venturi cone having this same length are then computed. The area at plane Y—Y is then made the same as the calculated diffuser inlet area, and the area at the throat of element 59 is made the same as the calculated diffuser outlet area.

While the particular apparatus herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A radial inflow turbine, which comprises a casing, a runner journaled in said casing, means to define a chamber generally peripherally of said runner and shaped to provide flow at substantially uniform velocity to all peripheral points of the runner, said chamber having a tangential inlet nozzle opening adapted to admit fluid under pressure, said chamber communicating with passages between the blades of said runner for introduction of said fluid into said passages and consequent radial inflow of said fluid to an outlet opening, a pair of arcuate movably supported valve elements in said chamber generally peripherally of said runner, and means to move said valve elements to vary the cross-sectional shape of the portion of said chamber through which said fluid flows from said inlet opening to said passages.

2. The invention as claimed in claim 1, in which said valve elements are pivoted for rotation about a pivot axis which lies in a plane generally perpendicular to the axis of rotation of said runner.

3. The invention as claimed in claim 2, in which said valve elements are generally semicircular in shape and have a free end adjacent said inlet opening, the other end of said valve elements being associated with said pivot axis, said pivot axis being disposed a substantial distance on the opposite side of said runner axis from said inlet opening.

4. The invention as claimed in claim 1, in which said chamber communicates with said passages through an opening free of nozzle means.

5. A radial inflow exhaust gas turbine, which comprises a generally annular casing, a runner journaled axially in said casing for rotation about a predetermined axis, said runner having generally radial blades, an annular chamber formed in said casing axially and radially adjacent the periphery of said runner, a continuous annular passage connecting said chamber to the passages between the blades of said runner, first and second tangential inlets to said chamber, said inlets being parallel to each other and entering said chamber in opposite directions and on opposite sides of a plane parallel thereto and containing said axis of runner rotation, first and second generally semicircular valve elements mounted in said chamber and cooperatively extending around substantially the full circumference thereof, said valve elements each having a free end adjacent one of said inlets and a pivoted end adjacent the other of said inlets, said pivoted ends being pivoted on shafts which are parallel to each other and extend outwardly in opposite directions and on opposite sides of a plane parallel thereto and containing said axis of runner rotation, said second-mentioned plane being oblique to said first-mentioned plane, means to rotate said shafts to pivot said valve elements and thus change the cross-sectional shape of the portion of said chamber through which fluid flows from said inlets to said annular passage, and outlet means connected to the eye of said runner.

6. The invention as claimed in claim 5, in which said inlets and shafts lie in a common plane which is radial to said axis of runner rotation.

7. The invention as claimed in claim 5, in which said pivoted ends of said valve elements are each shaped with surfaces which cooperate with said casing to form nozzle-shaped extensions of said inlets.

8. A turbo-compressor, which comprises a casing, a shaft journaled axially in said casing, first and second turbine runners mounted on said shaft, a compressor impeller mounted on said shaft, means in said casing to separate and seal said runners and said impeller each from the other to prevent direct fluid flow therebetween, scroll passages formed in said casing around each of said runners and around said impeller, and annular passage means connecting the respective scroll passages with passages between the blades of the respective runners and impeller, each of said annular passage means being free of nozzle or diffuser means.

9. The invention as claimed in claim 8, in which said casing has a generally annular peripheral wall.

10. In an automobile air-conditioning system, a generally annular outer casing, a generally annular inner casing mounted coaxially in said outer casing and spaced therefrom to form a passage of annular cross section, a shaft journaled axially in said inner casing, a turbine runner and a compressor impeller mounted on said shaft, said turbine runner being disposed in said inner casing, said compressor impeller being disposed in said outer casing and with its eye connecting to said passage of annular cross section, first scroll means to conduct compressed air to the periphery of said turbine runner, discharge means adapted to connect the eye of said turbine runner directly to the passenger compartment of said automobile, conduit means adapted to connect passenger compartment of an automobile to said passage of annular cross section and thus to the eye of said compressor impeller, and second scroll means to conduct compressed air away from the periphery of said compressor impeller.

11. The invention as claimed in claim 10, in which an insulating shroud is mounted around said inner casing adjacent said turbine runner to prevent heating of said inner casing by air flowing through said passage of annular cross section.

12. The invention as claimed in claim 10, in which said discharge means is a short extension of said inner casing and is adapted to pass through the fire wall of an automobile, and in which said conduit means is an annular passage encompassing said inner casing extension.

13. In combination, a gaseous fluid handling device having a hollow casing rotatably supporting a shaft therewithin, a bladed runner mounted on said shaft and having blades forming fluid channels extending between the hub area of said shaft and the periphery of said casing, a volute chamber formed in said casing and communicating annularly with the outer peripheral ends of said channels and communicating at a point remote therefrom with an opening through the casing wall, said gaseous fluid handling device being characterized by the provision of an adjustable valve within said volute chamber for adjusting fluid flow therethrough, said valve having a plurality of flow control elements movable between flow restricting and non-restricting positions with respect to the annular inlet to the periphery of said bladed runner and including control members movably supported in the casing wall forming said volute chamber.

14. The combination defined in claim 13 characterized in that said valve elements are fixed to shafts journaled in the wall of said volute chamber and pivotable from the exterior thereof.

15. The combination defined in claim 14 characterized in that said valve elements are crescent-shaped with one end portion thereof fixed to the inner ends of said shafts.

16. A turbo-compressor having a casing formed with a pair of turbine chambers at its opposite ends and a compressor chamber between said turbine chambers, a radial inflow turbine runner for each of said turbine chambers, a radial outflow compressor runner in said compressor chamber, a common supporting shaft secured to said runners, supporting bearing means for said shaft located between one of said turbine runners and said compressor runner, and a cold fluid inlet for said compressor chamber in heat exchange relation to said bearing means.

17. A turbine casing having a vaned runner rotatably mounted therein, said casing having a peripheral inlet flow supply means in communication with the rim of said runner, a fluid outlet means from said runner, the flow passage through said runner being so proportioned that the relationship of the effective flow area at the runner inlet, the actual length of the spiral flow path taken by flow particles in flowing therethrough and the effective flow area at the fluid outlet is equivalent to that through a diffuser cone of the same length as said spiral flow path and having an included angle of between 3 and 15 degrees.

18. A radial inflow turbine runner adapted to be rotatably mounted in a turbine casing having a peripheral fluid supply means and a fluid outlet means, said runner having vanes cooperating with one another when rotating to form spiral fluid flow passages, said runner being characterized in that the effective flow area at the peripheral inlet end of each passage thereof, the effective flow area of each outlet end adjacent the runner axis, and the length of the spiral path traversed by fluid particles flowing through said passages is equivalent to that through a diffuser cone of the same length and having an included angle of between 3 and 15 degrees.

19. A radial inflow turbine, which comprises a casing, a runner journaled in said casing, inlet nozzle passage means adapted to be connected to a source of fluid under pressure, means to define a substantially continuous annular passage connecting said inlet nozzle passage means to the peripheral portion of said runner to effect substantially uniform velocity flow of fluid from said inlet passage means to said runner and radially inwardly between the blades thereof, and outlet passage means characterized in that the effective flow area at the inlet to the runner, the cross-sectional area of said outlet passage means at said eye, as the length of the spiral path traversed by particles flowing from said inlet to said outlet passage means is equivalent to that through a diffuser cone of the same length and having an included angle of between three and fifteen degrees.

20. The invention as claimed in claim 19, in which said angle is about ten degrees.

References Cited in the file of this patent

UNITED STATES PATENTS

| | | |
|---|---|---|
| 181,646 | Derby | Aug. 29, 1876 |
| 705,347 | Harris | July 22, 1902 |
| 1,955,683 | Reiffenstein | Apr. 17, 1934 |
| 2,383,385 | Heintze | Aug. 21, 1945 |
| 2,425,885 | Jennings | Aug. 19, 1947 |
| 2,447,292 | Van Acker | Aug. 17, 1948 |
| 2,480,095 | Buchi | Aug. 23, 1949 |
| 2,618,470 | Brown et al. | Nov. 18, 1952 |
| 2,651,910 | Zakarian | Sept. 15, 1953 |
| 2,652,191 | Buchi | Sept. 15, 1953 |
| 2,739,782 | White | Mar. 27, 1956 |
| 2,823,851 | Shields | Feb. 18, 1958 |

FOREIGN PATENTS

| | | |
|---|---|---|
| 168,357 | Austria | May 25, 1951 |
| 182,584 | Austria | July 11, 1955 |